No. 786,811. PATENTED APR. 11, 1905.
E. HOLLIS.
CORN HARVESTER AND HUSKER.
APPLICATION FILED JUNE 20, 1904.

2 SHEETS—SHEET 1.

Witnesses
C. R. Reichenbach
W. C. O. Keyes

Inventor
E. Hollis
by
Chandler Chandler
Attorneys

No. 786,811. PATENTED APR. 11, 1905.
E. HOLLIS.
CORN HARVESTER AND HUSKER.
APPLICATION FILED JUNE 20, 1904.
2 SHEETS—SHEET 2.
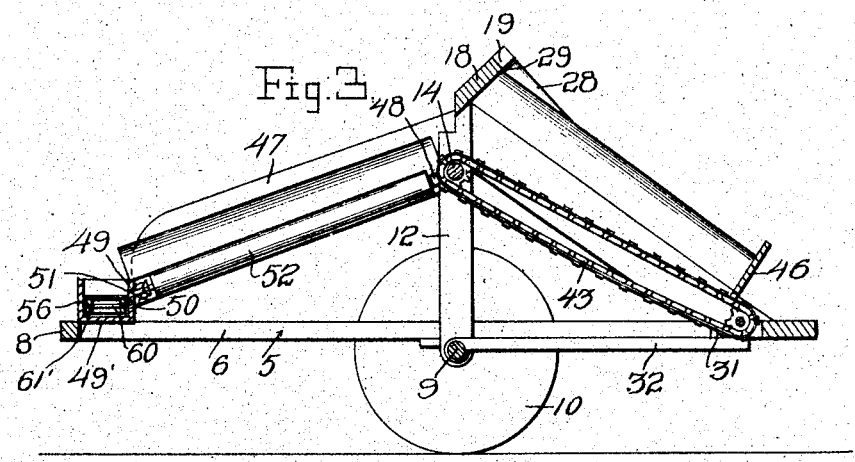
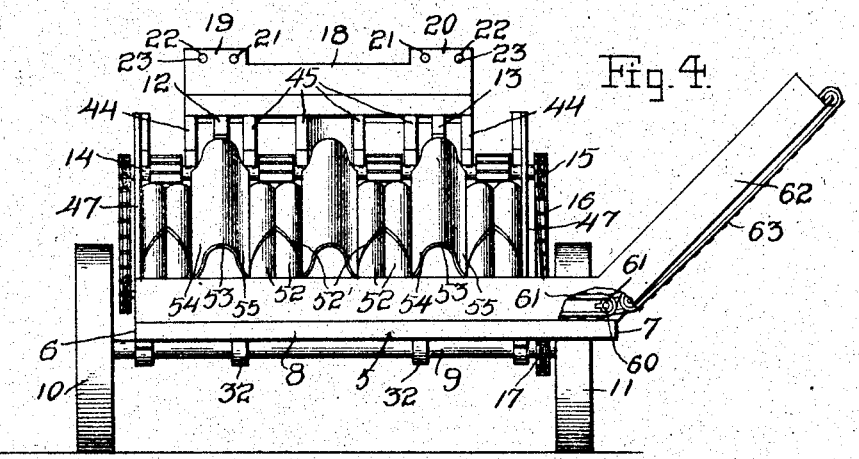
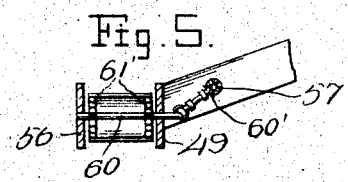

No. 786,811.

Patented April 11, 1905.

UNITED STATES PATENT OFFICE.

EZRA HOLLIS, OF OILFIELD, ILLINOIS, ASSIGNOR OF FOUR-FIFTHS TO M. J. GLICK, OF WESTFIELD, ILLINOIS.

CORN HARVESTER AND HUSKER.

SPECIFICATION forming part of Letters Patent No. 786,811, dated April 11, 1905.

Application filed June 20, 1904. Serial No. 213,380.

*To all whom it may concern:*

Be it known that I, EZRA HOLLIS, a citizen of the United States, residing at Oilfield, in the county of Clark, State of Illinois, have invented certain new and useful Improvements in Corn Harvesters and Huskers; and I do hereby declare the following to be a full, clear, and exact description of the invention, such as will enable others skilled in the art to which it appertains to make and use the same.

This invention relates to farm implements, and more particularly to corn-harvesting machines, and has for its object to provide in a single machine corn harvesting and husking mechanism which will remove the corn from the stalks, husk the ears, and deliver the husked ears from the machine.

Figure 1:
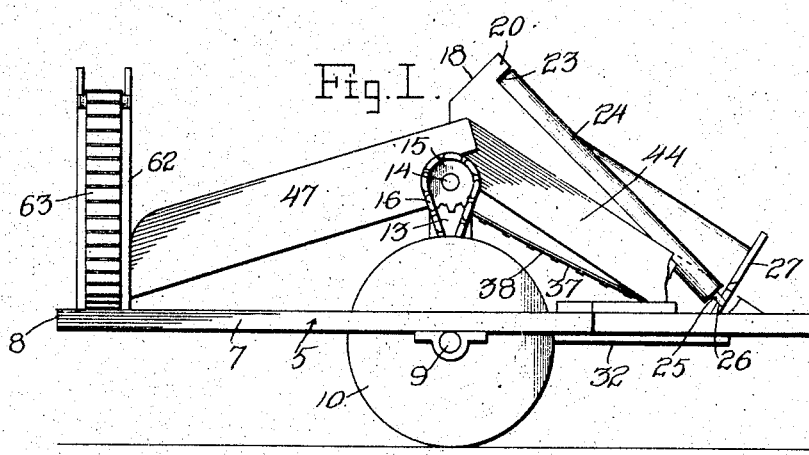
Figure 2:
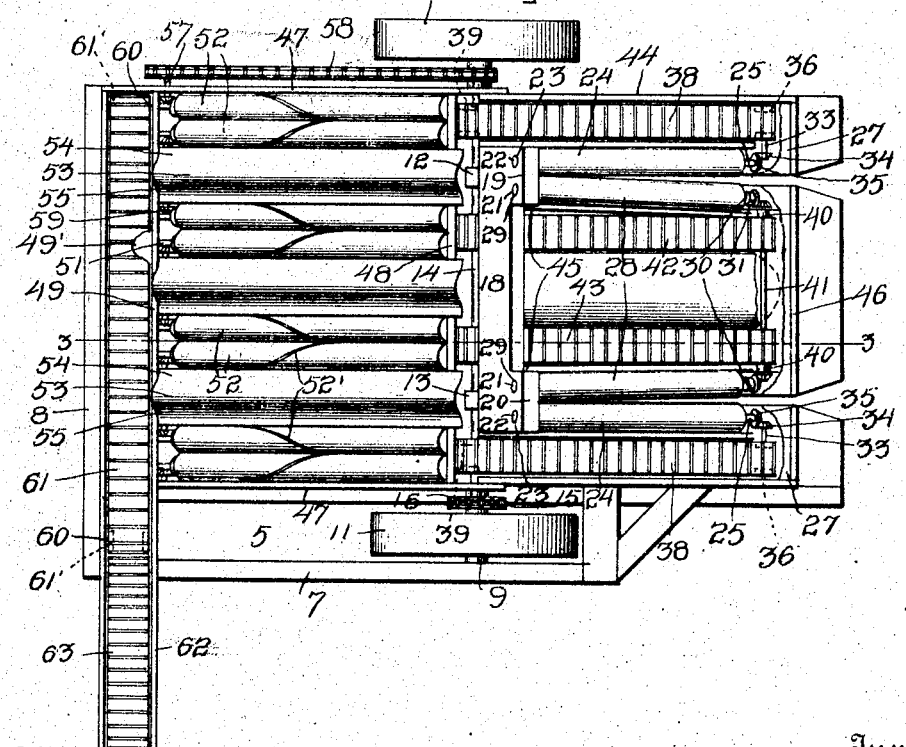

In the drawings forming a portion of this specification, and in which like numerals of reference indicate similar parts in the several views, Figure 1 is a side elevation of the machine. Fig. 2 is a top plan view of Fig. 1. Fig. 3 is a section on line 3 3 of Fig. 2. Fig. 4 is a rear elevation of the machine. Fig. 5 is a detail view showing the carrier-operating shaft.

Referring now to the drawings, the present invention comprises a frame 5, including side pieces 6 and 7, which are connected at their rearward ends by a cross-piece 8, the sides 6 and 7 having mounted therebetween an axle 9, upon which are revolubly mounted wheels 10 and 11.

Extending upwardly from the axle 9 and secured thereto are uprights 12 and 13, which have journaled therein a shaft 14, having a sprocket-wheel 15 upon one end, which is connected, by means of a crossed chain 16, to a sprocket 17, which is carried by the wheel 11.

To the upper ends of the uprights 13 there is attached a cross-piece 18, having bearing-blocks 19 and 20 secured thereto at the outer ends thereof, each of which has a pair of bearings 21 and 22 therein, the bearings 22 being nearest to the outer ends of the bearing-blocks. With the bearings 22 are engaged the upper trunnions 23 of snapping-rollers 24, the lower trunnions 25 of which are disposed in bearings 26 in lateral members 27, which extend inwardly from the ends of the sides 6 and 7 of the frame, and similar snapping-rollers 28 have their upper trunnions 29 engaged in the bearings 21 and their lower trunnions 30 engaged in bearing-brackets 31, carried by sills 32, which project forwardly from the axle 9. The bearings 26 and 31 are somewhat farther apart than the bearings 21 and 22, so that the rollers 24 and 28 diverge as they slant downwardly toward the forward end of the machine.

Journaled in bearings carried by the lateral extensions 27 are shafts 33, having bevel-gears 34 at their inner ends, which mesh with similar gears 35, carried by the trunnions 25 of the rollers 24. Each of these shafts has a pair of sprocket-wheels 36 mounted thereon, with which are engaged the chains 37 of conveyers 38, these chains being also engaged with sprockets 39, mounted upon the shaft 14.

Mounted in bearings 40 at the free ends of the sills 32 is a shaft 41, which has bevel-gear connection with the lower trunnions 30 of the rollers 28, and mounted upon this shaft 41 and the shaft 14 are a pair of conveyers 42 and 43, which are in every way similar to the conveyers 38.

Connecting the outer ends of the cross-piece 18 with the lateral member 27 are vertical side-boards 44, which extend below the upper sides of the conveyers 38 to prevent corn from falling therefrom and which also act as supports for the members 27. Similar boards 45 are attached at their upper ends to the cross-piece 18 and at their lower ends to a transverse member 46, which connects the ends of the sills 32, these boards 45 being disposed at the sides of the conveyers 42 and 43 for a similar purpose to that of the boards 44.

It will thus be seen that if the machine be moved over the ground in position for a row of corn to enter between the lower ends of the rollers 24 and 28 these rollers, which revolve downwardly and inwardly from each other, will snap the ears from the stalk, the ears falling upon the conveyers 38, 42, and 43, which will carry them to their upper ends and deposit them upon the husking mechanism to be described below, the corn being prevented from falling from the outer edges of the conveyers 38 by side-boards 46.

Extending downwardly from the upper ends of the side-boards 44, the lower ends of which are connected to the lateral member 27, are similar side-boards 47, the free ends of which are connected with the cross-brace 8 at the rearward end of the frame and lie thereabove. Between the side-boards 47, adjacent to the upper ends thereof, is a cross-piece 48, and a similar cross-piece 49 connects the side-boards adjacent to their lower ends, these cross-pieces having a plurality of bearings 50 therein which aline in pairs, and with the alining pair of bearings there are engaged the trunnions 51 of husking-rollers 52. As shown, these husking-rollers are arranged in pairs, the outermost pairs lying adjacent to the side-boards 47 and the pairs being separated from each other by partitions 53, having upwardly-convergent faces 54 and 55.

Projecting from the cross-piece 49, adjacent to the lower edge thereof, is a horizontal member 49', and attached to the outer edge of this member is an upwardly-extending transverse member 56, which is parallel with and spaced from the cross-piece 49. The horizontal member 49' is somewhat shorter than the cross-piece 49 and member 56, and between these portions, at the ends of the member 49', are shafts 60, having sprockets 61' thereon, with which are engaged the chains of a conveyer 61, and the shaft 60, which lies adjacent to the shaft 57, has a gear 60' meshed with the gear of the shaft 57. Attached to the framework in position to receive the discharge from the conveyer 61 is an upwardly-directed chute 62, having an elevator 63 therein. The trunnions 51 of the rollers 52 are connected, by means of bevel-gears 59, to a shaft 57, which has sprocket-and-chain connections 58 with the shaft 14, the rollers 52 being geared for movement of their faces inwardly and downwardly toward each other. Each of these rollers 52, as shown, is provided with a groove 52' in its periphery which encircles the roller and extends from end to end thereof, and the rollers are so disposed that as they revolve the grooves of each pair of rollers meet at a common point which travels from the upper to the lower extremities of the roller. It will thus be apparent that when the ears of corn are deposited upon the husking-rollers from the conveyers 38, 42, and 43, a pair of these rollers being arranged in the rear of each conveyer, the loose ends of the husks are engaged between the rollers and as the ears pass downwardly are torn therefrom, the grooves 52' greatly facilitating the engagement of the husks and removal thereof from the ears. From the rollers 52 the husked ears fall upon the conveyer 61, which discharges them onto the elevator 63, by which they are carried to a wagon with which the upper end of the chute 62 is engaged and which is driven beside the harvester.

What is claimed is—

In a corn harvesting and husking machine, the combination with a frame, of a fixed axle mounted in the frame, traction-wheels revolubly mounted upon the axle, a sprocket carried by one of the traction-wheels, uprights mounted upon the axle, a transversely-extending shaft journaled in the uprights adjacent to their upper ends, a sprocket-wheel carried by the shaft, a chain engaged with the sprocket-wheel of the shaft and with that of the traction-wheel, side-boards having bearings in which the shaft is revolubly engaged, said side-boards slanting downwardly and forwardly and being secured at their forward ends to the frame, a cross-piece secured to the upper ends of the uprights and having a pair of spaced bearings adjacent to each end, bearing-blocks carried by the frame at the forward end thereof and having bearings therein registering with those of the cross-piece, snapping-rollers having trunnions revolubly engaged in the registering bearings, said snapping-rollers lying between the side-boards and in spaced relation thereto, shafts journaled at the forward end of the frame and extending outwardly of the outermost snapping-rollers, a conveyer engaged with each of the last-named shafts and with the first-named shaft for rotation of the former when the latter is rotated, connections between the second-named shafts and the outermost snapping-rollers for rotation of the latter by the former, a shaft journaled forwardly of the snapping-rollers, said shaft terminating at both ends short of the outer faces of the innermost rollers of each pair, said shaft and said innermost rollers being connected for mutual rotation, a pair of conveyers engaged with the third-mentioned shaft and with the first shaft for operation of the former by the latter, one of said conveyers being disposed at the side of each pair of snapping-rollers, all of the conveyers being arranged for the reception of ears of corn from the snapping-rollers, side-boards secured at one end to the rearward ends of the first-mentioned side-boards, and at their other ends to the frame adjacent to the rearward end of the latter, cross-pieces secured to the second-named side-boards adjacent to the ends thereof and extending therebetween, said cross-pieces having spaced pairs of bearings therein, the bearings of one cross-piece registering with those of the other, husking-rollers having trunnions engaged in the registering bearings of the last-named cross-pieces, said pairs of husking-rollers being equal in number to the conveyers and being disposed to receive ears of corn therefrom, partitions disposed between the pairs of husking-rollers, the side faces of the partitions slanting upwardly toward each other, a shaft journaled adjacent to the rearward end of the frame, connections between this shaft and one of the husking-rollers, the husking-rollers of each pair lying in engagement with each other for rotation one by the other, connections between the pairs of husking-rollers for simultaneous rotation of the several husking-rollers, the husking-rollers of each pair being arranged for movement toward each other and downwardly, connections between the last-named shaft and the first shaft for operation of the former by the latter, and a conveyer arranged to receive ears of corn from the husking-rollers, said conveyer being connected with the driving-wheel for operation thereby, said frame having stalk-guides therein arranged to direct stalks between the snapping-rollers.

In testimony whereof I affix my signature in presence of two witnesses.

EZRA HOLLIS.

Witnesses:
MONROE J. GLICK,
L. A. RIDER.